United States Patent
Takada et al.

[11] Patent Number: 5,728,991
[45] Date of Patent: Mar. 17, 1998

[54] PLASMA ARC WELDING APPARATUS AND WELDING METHOD USING THE SAME

[75] Inventors: Hiroshi Takada; Masamitsu Kitahashi; Kunio Horiai; Iwao Kurokawa; Mikio Minonishi, all of Kanagawa-ken, Japan

[73] Assignee: Kabushiki Kaisha Komatsu Seisakusho, Japan

[21] Appl. No.: 537,913

[22] PCT Filed: May 6, 1994

[86] PCT No.: PCT/JP94/00745

§ 371 Date: Oct. 31, 1995

§ 102(e) Date: Oct. 31, 1995

[87] PCT Pub. No.: WO94/26456

PCT Pub. Date: Nov. 24, 1994

[30] Foreign Application Priority Data

| May 7, 1993 | [JP] | Japan | 5-106345 |
| Jul. 27, 1993 | [JP] | Japan | 5-40858 U |

[51] Int. Cl.$^6$ .................................................... B23K 10/00
[52] U.S. Cl. ........................ 219/121.46; 219/121.45; 219/124.1; 219/121.57
[58] Field of Search .................... 219/121.46, 121.45, 219/121.5, 121.54, 124.1, 124.33, 121.48, 121.57

[56] References Cited

U.S. PATENT DOCUMENTS

| 3,233,075 | 2/1966 | Sciaky | 219/127 |
| 4,087,670 | 5/1978 | Miller | 219/121 P |
| 4,664,587 | 5/1987 | Case, Jr. et al. | 219/124.1 |
| 4,891,489 | 1/1990 | Bollinger et al. | 219/121.48 |
| 5,147,997 | 9/1992 | Haberman | 219/121.5 |
| 5,550,344 | 8/1996 | Winterfelt | 219/121.39 |

FOREIGN PATENT DOCUMENTS

| 8715217 | 2/1988 | European Pat. Off. . |
| 56-4351 | 1/1981 | Japan . |
| 57-28674 | 2/1982 | Japan . |
| 58-116981 | 12/1983 | Japan . |
| 235412 | 9/1990 | Japan . |
| 39902 | 3/1991 | Japan . |

*Primary Examiner*—Mark H. Paschall
*Attorney, Agent, or Firm*—Ronald P. Kananen

[57] ABSTRACT

There is provided a plasma arc welding apparatus which comprises a plasma torch and a spacing retention member which is securely fixed to the plasma torch and whose frontal end is located between a frontal end of the plasma torch and a weld workpiece and is adapted to be pressed against the workpiece while the latter is being welded. There is also provided a plasma arc welding method which makes use of a plasma arc welding apparatus that comprises a plasma torch and a spacing retention member which is securely fixed to a base of the plasma torch and whose frontal end is located between a frontal end of the plasma torch and a welding workpiece, in which method the frontal end of the spacing retention member is pressed against the workpiece while the latter is being welded.

33 Claims, 19 Drawing Sheets

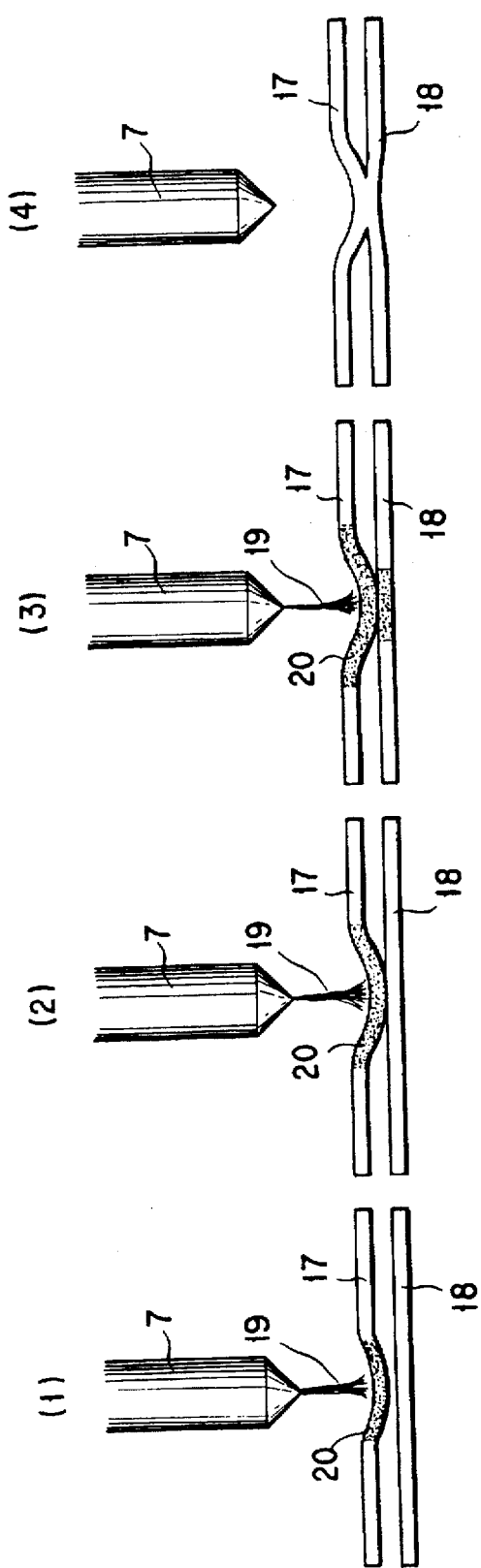

_ _ _

PLASMA ARC WELDING APPARATUS AND WELDING METHOD USING THE SAME

TECHNICAL FIELD

The present invention relates to a plasma arc welding apparatus for welding together a plurality of plate materials laid one over another and also to a welding method in which such an apparatus is used.

BACKGROUND ART

As a welding apparatus for spot welding together a pair of plate materials laid one over the other by using an arc, there has hitherto been known an arc spot welding apparatus as disclosed in Japanese Unexamined Patent Publication No. Sho 58-116981.

Such an arc spot welding apparatus as in the prior art has been configured as shown in FIG. 1 attached hereto. Thus, the apparatus includes: an arc spot welding machine a of which a base is mounted on an arm of a welding robot (not shown) and of which an end portion is provided with a welding torch d; and an air cylinder c which is coupled to the welding machine a via an arm b to move integrally with the welding machine a and which has a pressing member f coupled to a frontal end thereof. And, after the torch d is set in position to oppose to a front side plate material e at a predetermined distance therefrom (viz. a parameter that is called "standoff"), the air cylinder unit c is actuated to cause its thrust member f to be pressed against the front side plate material e, thus expelling any gap between the latter and a rear side plate material g then to weld the two plate materials e and g together by means of the welding torch d. In the Figure, symbol h designates a table for supporting the rear side plate material g.

In the above mentioned conventional technique, it has thus been a practice that the welding torch d is set at a predetermined position before the air cylinder unit c is operated to move the front side plate member e under the pressing member f by the distance corresponding to the gap between the two plate materials. It has then be unavoidable that a deviation results from an originally set value in the spacing (i.e. "standoff") between the end portion of the welding torch d and the front side plate material e, to be welded to the rear side material.

This has led to a requirement that when the welding torch d is preset in position, a dimension corresponding to the gap between the two plate materials e and g needs then to be taken into account, making the associated positioning control complicated. Also, if the front side plate material e may not deform as desired, there arises a problem that an arc spot welding may not proceed as at a desirable spacing, hence disabling a predetermined strength of welding to be attained.

While the above mentioned prior art problems discussed are in regard to those in the arc spot welding technique, similar problems arise in a plasma arc welding apparatus.

Also, there has hitherto been known in the prior art a plasma arc welding apparatus with a plasma torch that can manually be handled by an operator. A plasma torch of this kind as used in the prior art is configured as shown in FIG. 2 attached hereto. It is seen that a handle k is securely fixed on a side surface of a torch body j that has a plasma nozzle i at its frontal end. In the so configured prior art plasma torch, the plasma nozzle i is formed integrally with the torch body j, and this requires, in adjusting and maintaining a distance (i.e. "standoff") from the frontal end of the nozzle i to a workpiece, that only the operator's reliance on a eye measurement be adopted. Thus, the adjustment and maintenance of the standoff, which is one of the most important factors in plasma arc welding and should, in its optimum values, vary depending upon particular materials and thicknesses of various weld workpieces, have significantly been accomplished manually. Hence, with a plasma torch of the construction mentioned above, it has been customary that only an operator of considerable skill would be capable of achieving a stabilized welding operation.

Accordingly, with the above mentioned points taken into account, it is an important object of the present invention to provide a plasma arc welding apparatus as well as a welding method using the same, which is capable of maintaining, at all times, constant the standoff that is a parameter representing the spacing between the frontal end of a plasma torch and a front side plate material; which allows the standoff to be readily adjusted; and which permits an operation to be performed with an optimum standoff for any material and thickness, whatsoever, of a workpiece. The foregoing object is intended to apply to both an arrangement in which the plasma torch is carried by a welding robot where the front side plate material is pressed so as to expel its gap formed with a rear side plate material, and an arrangement with the plasma torch manually handled by an operator, whichever.

SUMMARY OF THE INVENTION

In order to attain the objects mentioned above, there is provided in accordance with the present invention, in a first construction thereof, a plasma arc welding apparatus which comprises: a plasma torch; and a spacing retention member which is securely fixed to the said plasma torch and whose frontal end is located between an frontal end of the said plasma torch and a weld workpiece and is adapted to be pressed against the said workpiece for a welding thereof.

In the above construction, where the said weld workpiece comprises a pair of materials with a gap formed between them, a spacing ("standoff") between the said frontal end of the plasma torch and the said weld workpiece will first be set up. Then, if the said gap is expelled by thrusting the said weld workpiece forward by means of the side of the said frontal end of the spacing retention member by means of an welding robot or manually, it is noted that the standoff which represents the spacing between the said frontal end of the plasma torch and the said weld workpiece will remain invariable and thus a spot welding operation can be carried out with the standoff which remains constant at all times. And, since the standoff can be maintained constant, it follows that it is possible to facilitate the setting of the said plasma torch to a preselected position by means of the welding robot or the like.

And, in addition to the above mentioned construction, it is desirable that the axial position of the frontal end of the spacing retention member be adjustable relative to the Frontal end of the said plasma torch.

According to this construction, note that the standoff can be adjustable as desired to meet welding conditions imposed. This allows an operation to be carried out with an optimum standoff for a particular material and thickness of a weld workpiece.

Further, it is preferable that a displacement means be provided for pressing the said spacing retention member against the weld workpiece.

Also, the said spacing retention member may be a torch holder which can be mounted on an arm of the welding robot and which is threaded with the said plasma torch so as to be capable of advancing and retreating. And, a displacement means may be interposed between the said arm and the said torch holder. Also, the frontal end of the said torch holder may be a cylindrical member surrounding the frontal end of the said plasma torch. It may thus form a frontal cylindrical wall, which can be formed with a recess or hole for the purpose of venting a gas.

Also, preferably, the said spacing retention member is a casing that surrounds the said plasma torch and that is mounted on the arm of the welding robot. And, the distance between the casing mounting portion and the frontal end of the said plasma torch may be made capable of being increased and decreased, whereas the frontal end of the plasma torch may be axially displaced relative to the said casing by means of a displacement means fixed to the casing. Also, the frontal end surrounding wall of the casing may be formed with a hole or recess for the purpose of venting a gas.

Also, preferably, the said spacing retention member is an annular spacer attached to the frontal end of the said plasma torch while a handle is attached to the plasma torch. And, an axial supporting frame formed in the said spacer may be axially slidably fitted with a bracket securely fixed to the frontal end of the said plasma torch, and may be so fixed to the bracket as to be axially adjustable in position by means of a fixed screw fitted in an axially extending elongate hole of the said supporting frame and threaded in the said bracket. Also, the surrounding wall of the said spacer may be formed with a hole or recess for the purpose of venting a gas.

Also, preferably, the said spacing retention member is a casing surrounding the said plasma torch and a handle is attached to the said casing. And, in this connection, a pair of handles may be so attached. Also, the distance between the casing mounting portion and the frontal end of the said plasma torch may be made capable of being increased and decreased, and the frontal end portion of the said plasma torch may be made axially displaceable relative to the said casing by means of a displacement means fixed to the said casing. Also, the frontal end surrounding wall of the said casing may be formed with a hole or recess for the purpose of venting a gas.

Also, preferably, the said spacing retention member is a protecting cap attached to the frontal end of the said plasma torch while the said plasma torch is mounted on an arm of a welding robot. And, a displacement means may be interposed between the said arm and the said plasma torch. Also, the said protecting cap may be a cylindrical member surrounding the frontal end of the plasma torch, and the frontal end surrounding wall may be formed with a hole or recess for the purpose of venting a gas. Also, preferably, an interlock circuit is provided between the said plasma torch and an operating power supply for preventing an incidence of electric shock.

According to this construction, an operator is prevented from carelessly encountering with an electric shock due to a pilot arc.

And, in the above mentioned case, a welding start switch that should be included in the said interlock circuit may be provided in the above mentioned handle.

Also, preferably, the said displacement means is connected to an automatic standoff control circuit.

According to this construction, the control of the standoff can be accomplished extremely readily.

And, in the above mentioned case, a torch displacement switch that should be included in the said automatic standoff control circuit may be provided in the above mentioned handle.

Also, preferably, an interlock circuit is provided between the plasma torch and an operating power supply for preventing an incidence of electric shock while an automatic standoff control circuit is connected to the above mentioned displacement means. And, a welding start switch that should be included in the above mentioned interlock circuit and a torch displacement switch that should be included in the above mentioned automatic standoff control circuit may be provided in the above mentioned handles.

The present invention also provides, in a second construction thereof, a plasma arc welding method which makes use of a plasma arc welding apparatus that comprises: a plasma torch and a spacing retention member which is securely fixed to a base of the said plasma torch and whose frontal end is located between an frontal end of the said plasma torch and a welding workpiece, in which method the said frontal end of the said spacing retention member is pressed against the said workpiece while the latter is welded.

In addition to the above mentioned construction, it is preferable that the said Frontal end of the said spacing retention member be adjusted in its axial position relative to the said frontal end of the said plasma torch. Further, in addition to the above mentioned construction, it is preferable that after a commencement of welding, too, the said frontal end of the said spacing retention member be adjusted in its axial position relative to the said frontal end of the said plasma torch.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings:

FIG. 7 is a diagrammatic representation illustrating a series of steps of a spot welding process according to the above mentioned embodiment;

BEST MODES FOR CARRYING OUT THE INVENTION

Hereinafter, suitable embodiments of the present invention with respect to a plasma arc welding apparatus and a welding method using the same will be set out with reference to the accompanying drawings.

Figure 1:
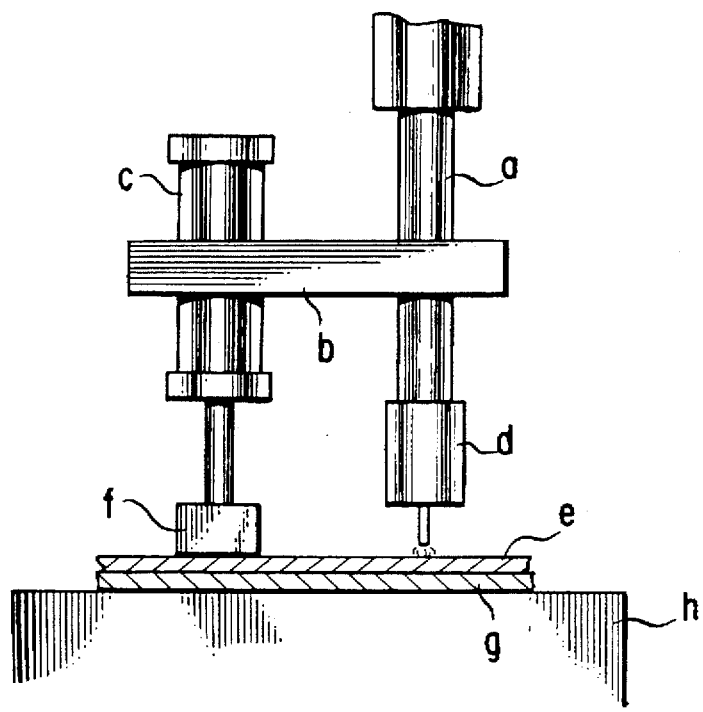
FIG. 1 is diagrammatic view illustrating an example of the conventional plasma arc welding apparatus.
Figure 2:
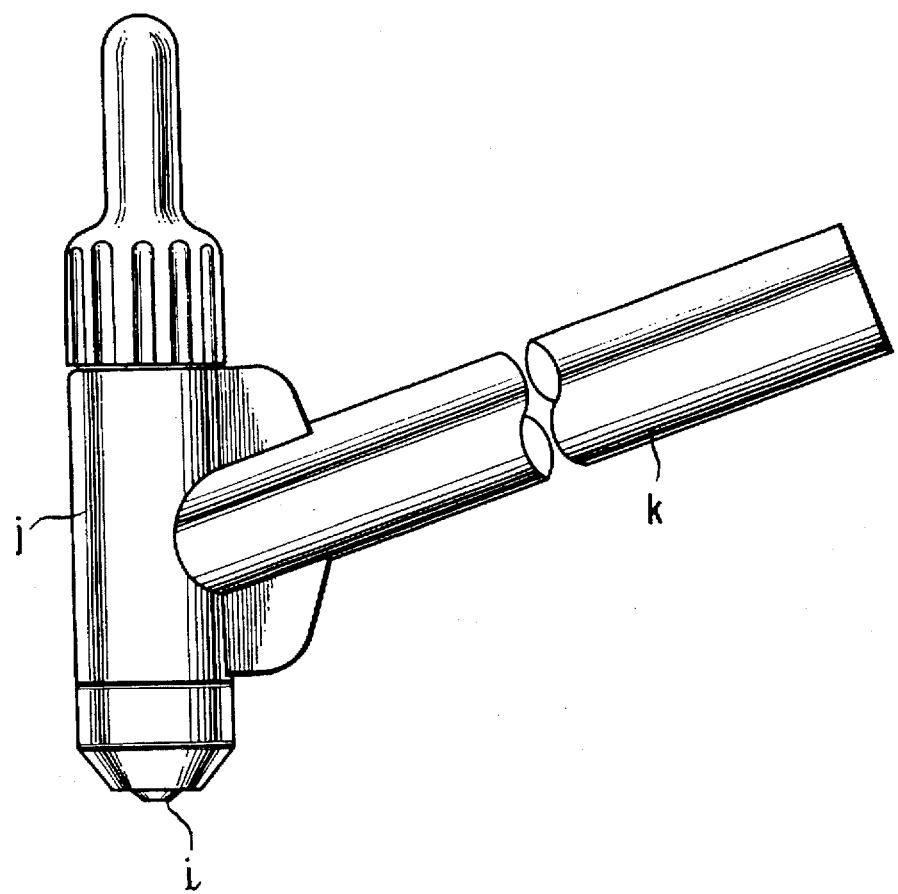
FIG. 2 is a diagrammatic view illustrating another example of the conventional plasma arc welding apparatus.
Figure 3:
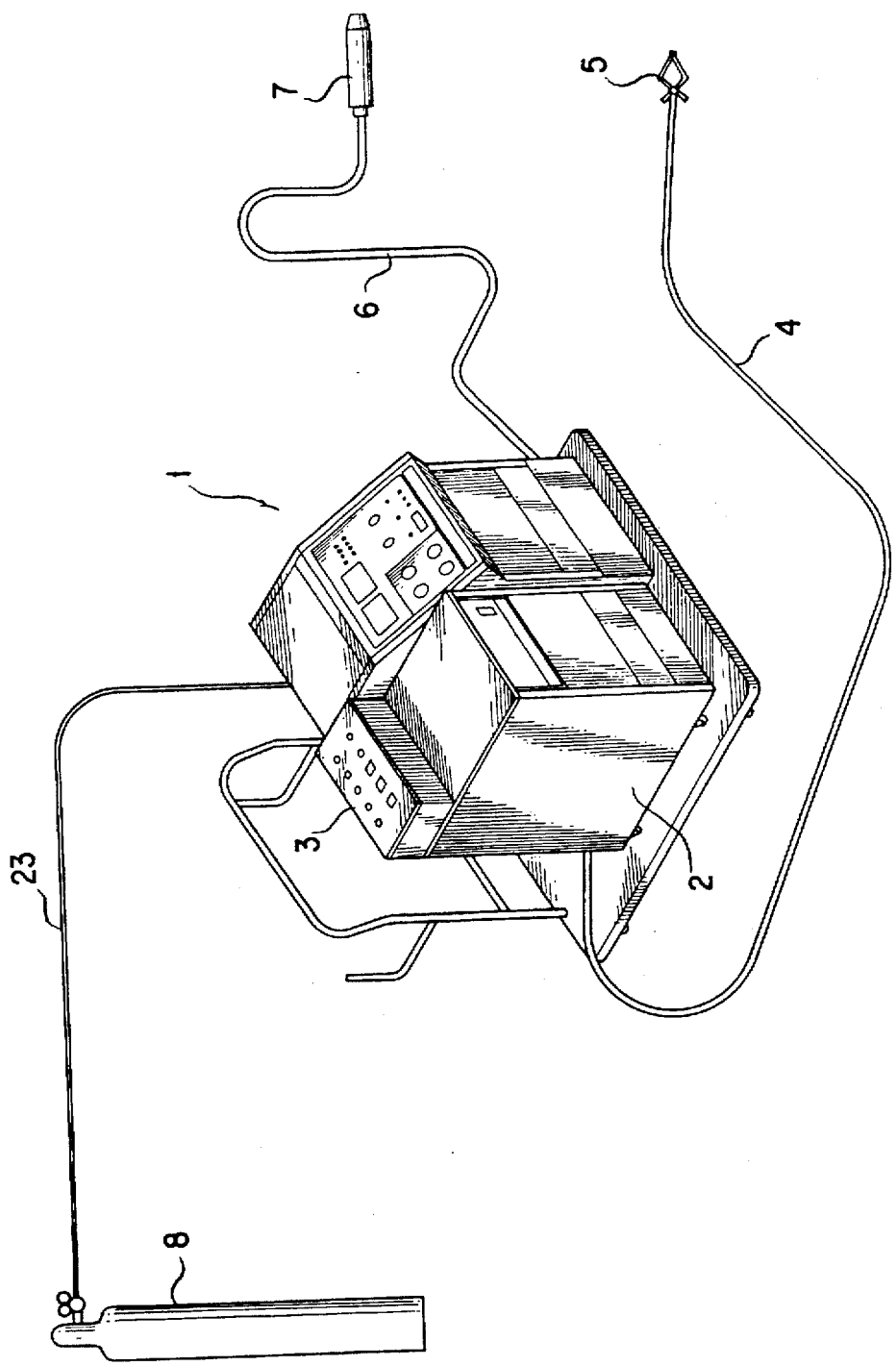
FIG. 3 is a perspective view illustrating a first embodiment according to the present invention.

FIGS. 3 to 6B show a first embodiment of the plasma arc welding apparatus that is constructed in accordance with the present invention. In FIG. 3, there is shown a plasma arc welding machine 1 which comprises a power supply 2, and a control part 3 that incorporates a high frequency unit. The power supply 2 is connected via a cable 4 incorporating a wire to a welding material clamp 5, whereas the control part 3 is connected to a plasma torch 7 via a torch cable 6 incorporating a gaseous conduit and a wire. Also, numeral 8 represents a gas cylinder which is connected to the control part 3 via a gaseous conduit 23.

Figure 4:
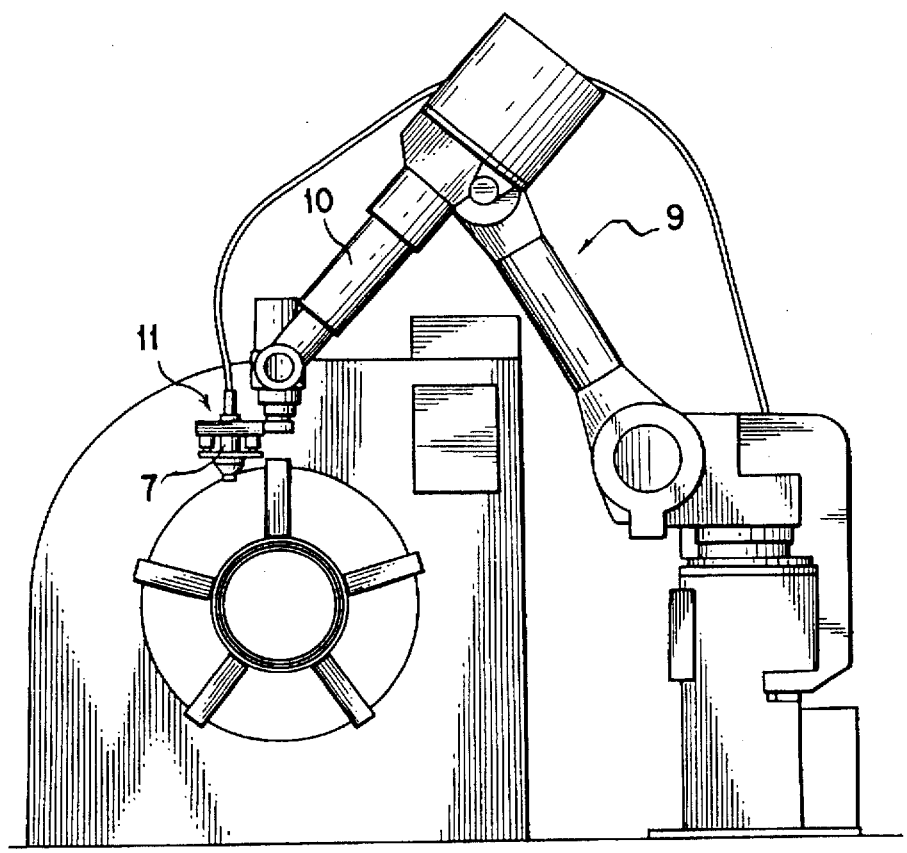
FIG. 4 is a diagrammatic view illustrating a state in which a plasma torch in the above mentioned first embodiment of the plasma arc welding apparatus is installed on a welding robot.

The above mentioned plasma torch 7 is used, as shown in FIG. 4, for mounting on a torch retention means 11 which is securely fixed to a frontal end of an arm 10 of an articulated-type welding robot 9.

Figure 5:
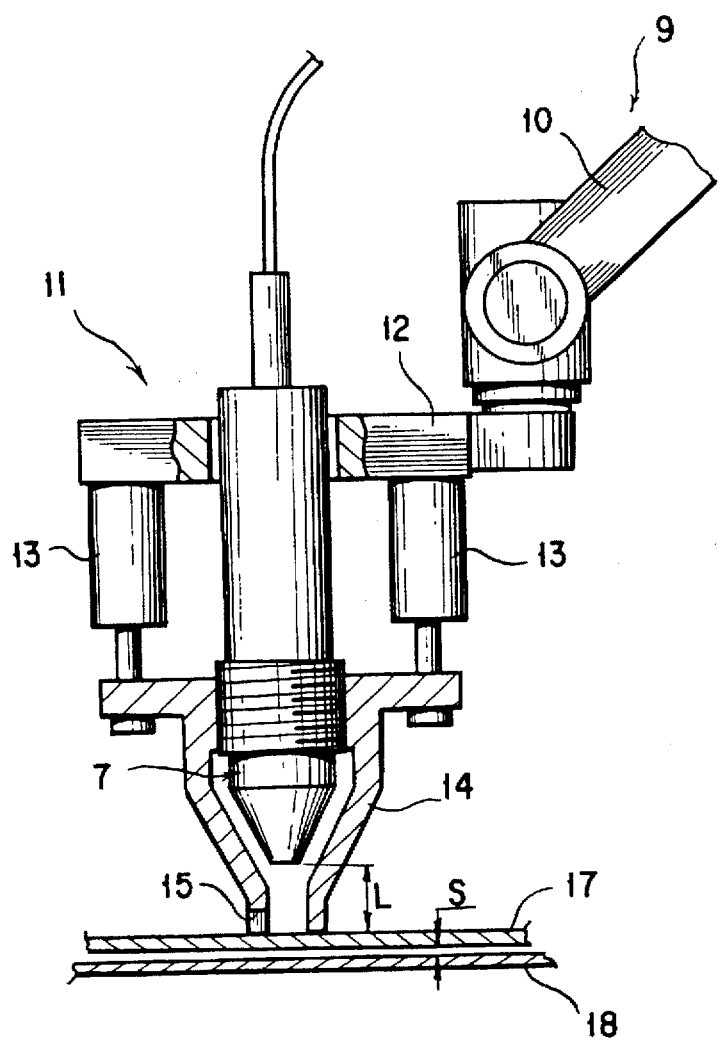
FIG. 5 is a front elevational view, partly cut away, of a torch retention apparatus means in the above mentioned first embodiment.

A structure for coupling the above mentioned retention means 11 to the plasma torch 7 is shown in FIG. 5. A bracket 12 mounted on the frontal end of the arm 10 has a torch holder 14 coupled thereto via a plurality of air cylinder units 13. And the torch holder 14 has the plasma torch 7 threaded therewith, which is thus made capable of axially advancing and retreating as desired relative thereto.

In connection with the above, it should be noted that the air cylinders 13 are not of absolute necessity and the torch holder 14 may be directly coupled.

Figure 6A:
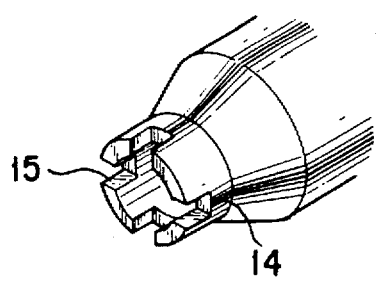
FIGS. 6A and 6B are perspective views illustrating different embodiments of a frontal end portion of the torch retention means, respectively.
Figure 6B:
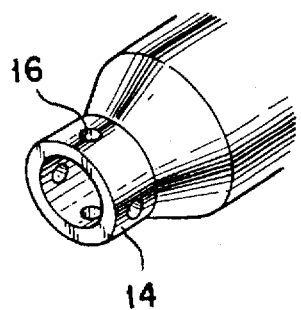

The frontal end of the torch holder 14 is configured to project axially outwards beyond the frontal end of the plasma torch 7, thus positioning between the frontal end of the plasma torch 7 and the materials to be welded together, and to be cylindrical so as to surround the frontal end of the plasma torch 7. And, the distance from the frontal end of the plasma torch 7 to the frontal end of torch holder 14, that is the standoff L, is made adjustable by enabling the plasma torch 7 to be advanced and retreated axially. Thus, in the present embodiment the torch holder 14 serves as a spacing retention member for maintaining or adjusting the standoff L. Also, the frontal end of the torch holder 14 is formed with slits 15 or holes 16, for venting a gas, as shown in FIGS. 6A and 6B, respectively. It should be noted that the torch holder 14 is formed of an electrically insulating material.

It should also be noted that the frontal end alone of the torch holder 14 may be formed of an electrically insulating material.

The operation of the above mentioned first embodiment will be set out below.

In spot welding together a front side plate material 17 and a rear side plate material 18 which are spaced apart by a spacing S as shown in FIG. 5, the spacing between the frontal end of the torch holder 14 and the frontal end of the plasma torch 7, that is the standoff L, will first be set at an optimum value. Next, by operating the arm 10 of the welding robot 9, the frontal end of the torch holder 14 of the torch retention means 11 will be displaced above a welding point on the front side plate material 17. Subsequently, by operating the air cylinders 13, the torch holder 14 will be axially displaced downwards to bring its frontal end into contact with the front side material 17 and further to thrust the material 17 forward by the distance S so that the two welding materials 17 and 18 may be firmly contacted with each other. Then, since the plasma torch 7 is moved integrally with the torch holder 14, there will be no change in the standoff L. Thus, without regard to any magnitude of the spacing S between the two materials 17 and 18, the standoff L at the time of welding will be held constant at all times. At this point it should be noted that while in the embodiment just described the welding material is shown as pressed by the air cylinders 13, in an operation with the torch holder 14 used alone it may be pressed with the arm 10 of the welding robot 9 to bring the two plate materials 17 and 18 firmly in contact with each other.

FIG. 7 diagrammatically shows a sequence of the operation in which after the two plate materials are firmly brought into contact with each other, they are spot-welded together.

(1) A plasma jet 19 is projected out of the plasma torch 7 and is used to heat up, by means of its arc heat, one of two plate materials placed one over the other, viz. a front side plate material 17 which is disposed proximate to the plasma torch 7 to form a molten pool 20 in the front side plate material 17.

(2) While retained not to drop itself by the action of a surface tension, this pool 20 is brought into contact with a rear side plate material 18 under a pressure of the plasma jet 19.

(3) Through a thermal conduction, the rear side plate material 18 is thoroughly heated up and molten, the weld penetration arriving to the rear side of the rear side plate material 18.

(4) The plasma jet 19 is terminated to terminate the welding operation.

While in the diagrammatic representations oil FIG. 7 the two plate materials 17 and 18 are shown to have a large spacing between them, it will readily be apparent that in practice such a spacing has become fully reduced by a forced engagement by the torch holder 14 of the torch retention means 11 as have been set forth.

As described above, where there is a spacing S between a front side material 17 and a rear side material 18 to be welded together, after a setting is completed by a welding robot 9, even where the front side material 17 is thrusted forward by the frontal end of the torch holder 14 to remove the above mentioned spacing S, the standoff L that represents the spacing between the frontal end of the plasma torch 7 and the front side material 17 remains invariable. Hence a spot welding operation can be carried out by means of a plasma arc 19 while maintaining the standoff L constant at all times. And, since the standoff L can be maintained constant as mentioned above, an operation required to set a plasma torch 7 at a predetermined position by a welding robot 9 is greatly facilitated.

Figure 8:
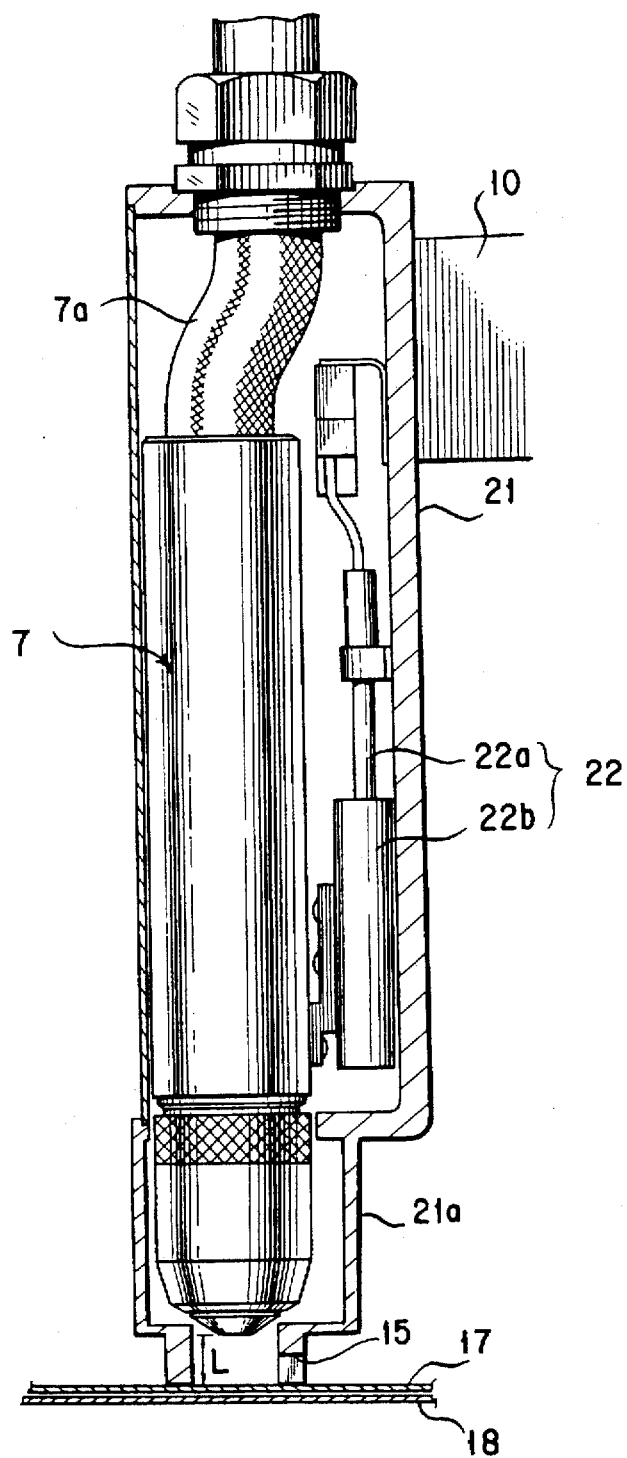
FIG. 8 is a side sectional view in elevation illustrating a second embodiment of the plasma arc welding apparatus according to the present invention.

FIG. 8 shows a second embodiment of the present invention, in which a casing 21 that is securely fixed to the base of the plasma torch 7 is provided so as to surround the plasma torch 7 and in which the frontal end of the plasma torch 7 is made axially displaceable relative to the casing 21 so as to enable the standoff L, to be freely variable within a limited range. Thus, the casing 21 has been designed to serve as a spacing retention member for maintaining or adjusting the standoff L.

More specifically, a portion 7a interposed between the frontal end and the base of the plasma torch 7 is made capable of being elongated and contracted while the casing 21 has an air cylinder unit 22 disposed therein and is provided at its frontal end with a stepped cylindrical portion 21a. The air cylinder unit 22 is provided with a rod portion 22a securely fixed to the casing 21 side and a cylinder portion 22b securely fixed to the frontal end side of the plasma torch 7. The construction is so designed that by operating the air cylinder unit 22, the frontal end of the plasma torch 7 may be axially displaced relative to the casing 21 so as to enable the standoff L to be controlled as desired.

Furthermore, the casing 21 is mounted on the arm 10 of the welding robot 9 and also is formed at its frontal end cylindrical wall portion 21a with a hole or slit that is designed for venting a gas.

Figure 9A:
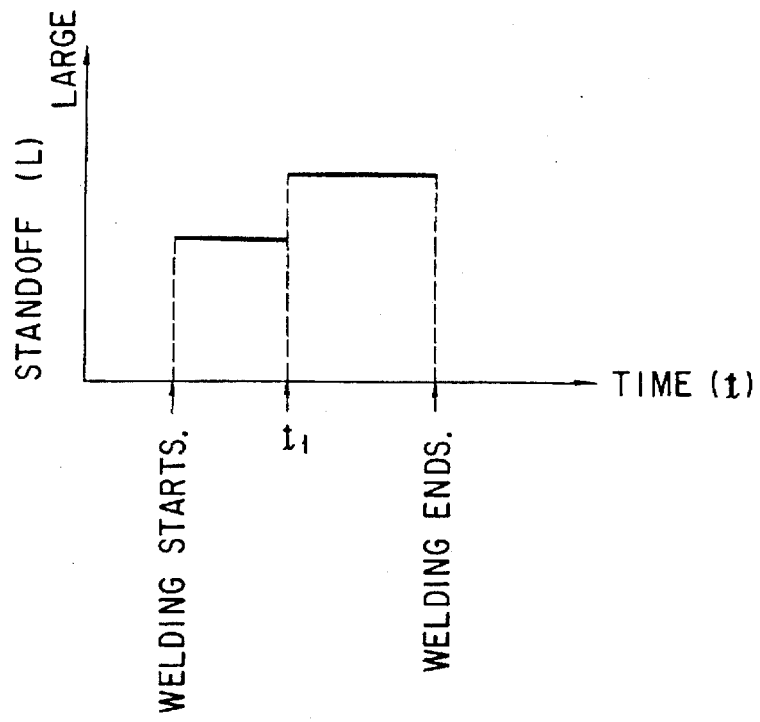
FIGS. 9A and 9B are graphs illustrating two examples in which the standoff is varied during a welding process in the above mentioned second embodiment.
Figure 9B:
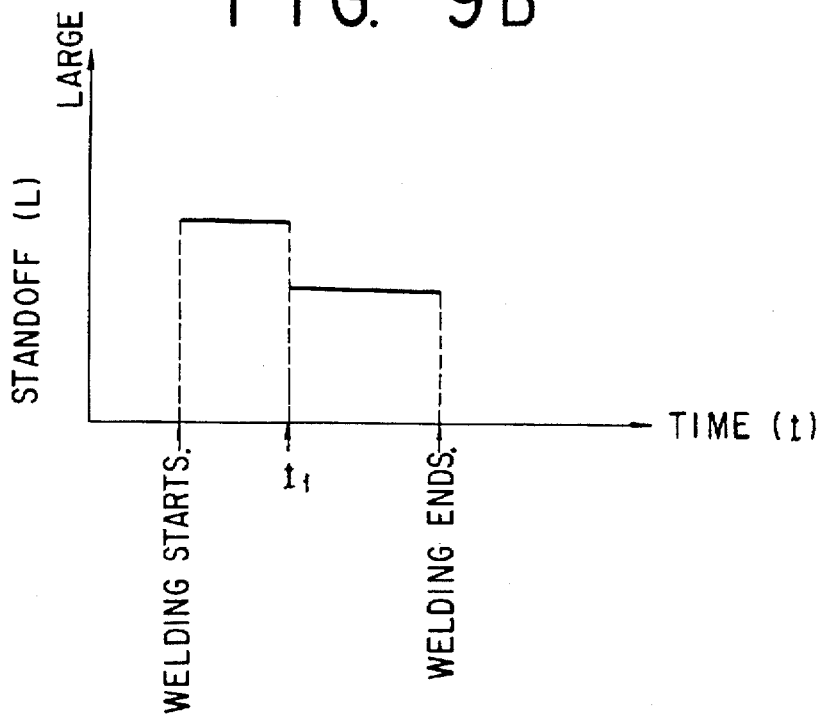

It should be noted at this point that as shown in FIG. 9A and 9B there are instances in which it is desirable for the standoff L to be varied with the progress of time. This is required, for example, where the welding nugget diameter needs to be varied, or in order to prevent a solidifying crack in a spot welding operation. In this manner, the standoff L can be optionally varied in accordance with particular welding conditions required.

Figure 10:
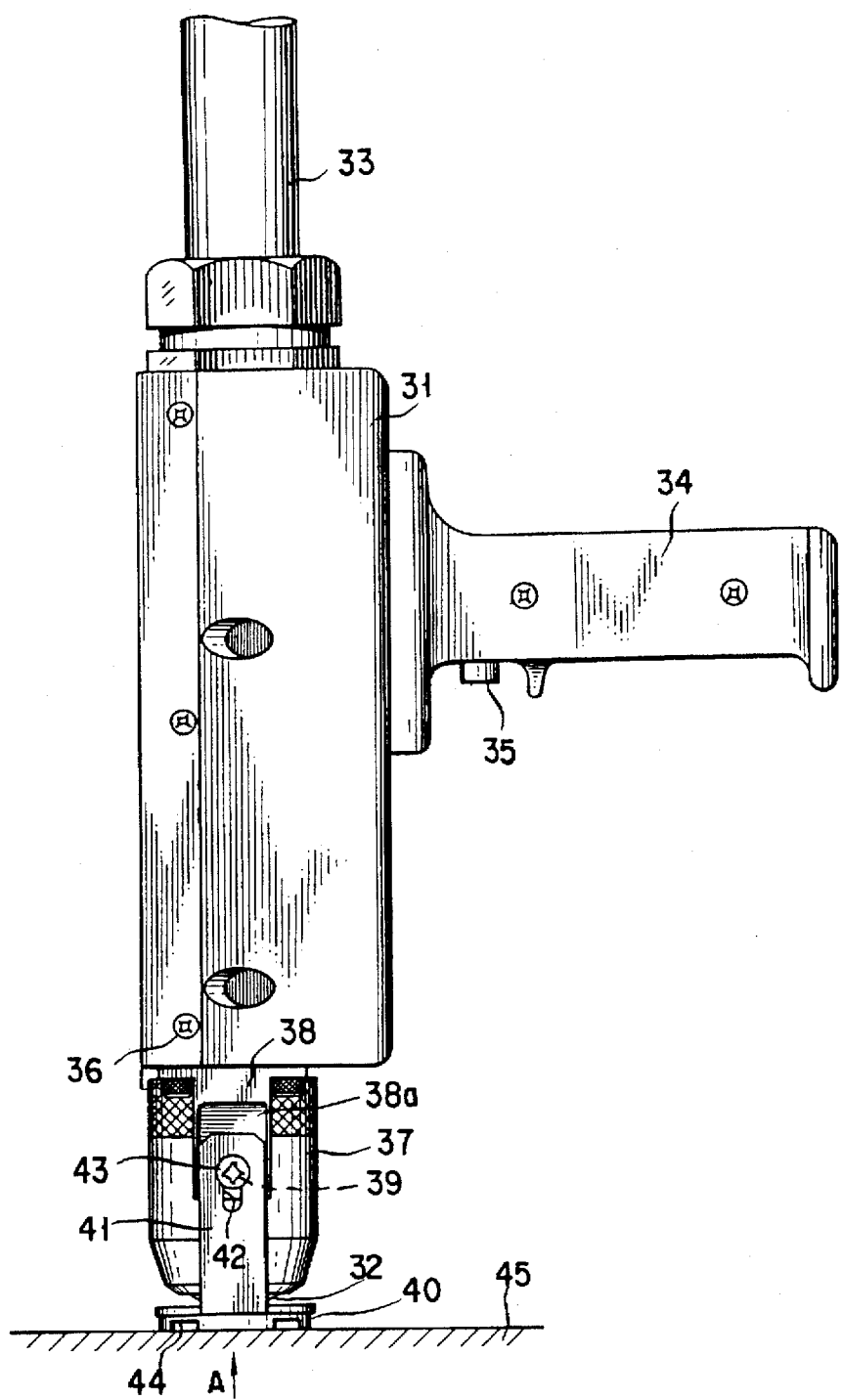
FIG. 10 is a side elevational view illustrating a third embodiment of the plasma arc welding apparatus according to the present invention.
Figure 11:
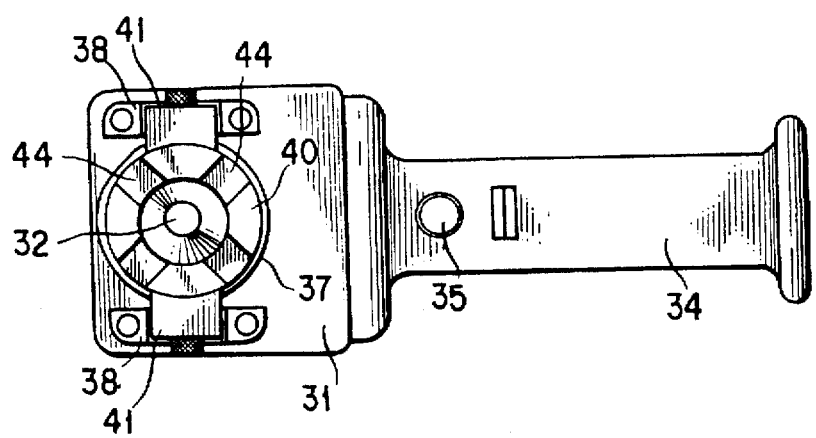
FIG. 11 is a plan view as seen in the direction of arrow A of FIG. 10.
Figure 12:
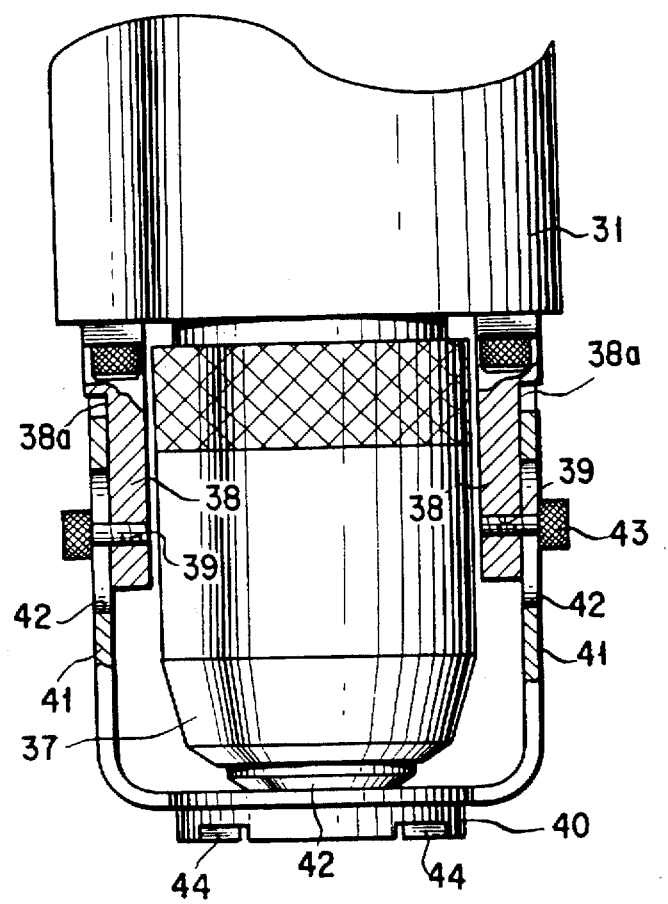
FIG. 12 is a side elevational view, partly cut away, illustrating the construction of a spacer portion in the above mentioned third embodiment.

FIGS. 10 through 12 shows a third embodiment of the present invention.

In the Figures, numeral 31 designates a plasma torch, of which a frontal end is provided with a plasma nozzle 32 and that has its base from which an electromagnetically shielded flexible torch cable 33 incorporating a gaseous conduit and a wire is led out. And, a side surface of the torch body 31 has securely fixed thereto a handle 34, which is provided with a welding start switch 35 as embeded therein. Its connected lead is passed through the torch cable 33 and wired into a control unit of a plasma power supply.

In this connection it should be noted that all of the above mentioned plasma torch 31, screws 36 used for assembling the same, and further the handle 34 as well as the welding switch 35 are each formed of an electrically insulating material.

Positioned at both sides of a nozzle cap 37 provided to surround the above mentioned plasma nozzle 32, there are a pair of brackets 38 and 38 securely fixed to the frontal end of the plasma torch 31. The brackets 38 and 38 in a pair are formed with axially extending guide recesses 38a and 38a, respectively, which have an intermediate portion through which are formed threaded holes 39 and 39. Also, the nozzle cap 37 surrounding the plasma nozzle 32 are electrically insulated from electrodes and the plasma nozzle 32 by means of an interior insulating ring not shown.

Numeral 40 denotes a ring-shaped spacer 40 which is positioned at the frontal end side of the above mentioned plasma nozzle 32. At its radially extending both sides there are projected supporting frames 41 and 41 lying in slidable engagement with the guide recesses 38a and 38a that are formed in the above mentioned two brackets 38 and 38, respectively. These two supporting frames 41 and 41 are formed with longitudinally extending elongate holes 42 and 42, respectively. A pair of screws 43 and 43 in fitted engagement with these elongate holes 42 and 42 are inserted in threaded engagement into the threaded holes 39 and 39, respectively. And, the spacer 40 is made adjustable in its axial position within a range permitted by a said elongate hole 42 and a said screw 43 for a said supporting frame 41 to slide, and is securely fixed in an adjusted position to a said brackets 38 by tightening a said screw 43. Thus, in the present embodiment, the spacer 40 is designed to serve as a spacing retention member for the maintenance and adjustment of the standoff L.

Also, the frontal end surface of the spacer 40 is aligned orthogonally to the axis of the plasma nozzle 32 and is also formed in its radial directions with recesses 44 which are designed to allow a plasma gas to radially flow out or vent.

In connection with the above, it should he noted that the spacer 40 may be made of copper, brass, stainless steel, mild steel, silver, aluminum or a ceramic. Also, the supporting frames 41 and 41 may be made of copper, silver, brass, stainless steel, mild steel or aluminum.

In the the present embodiment hereof, a plasma welding operation with the handle 34 gripped is carried out while displacing or fixing in position the spacer 40 that is pressed against a workpiece 45.

In this case, since the end surface of the spacer 40 lies orthogonally to the axis of the plasma nozzle 32, the plasma nozzle 32 is at all times opposite to the workpiece 45 orthogonally thereto. And, the standoff is then maintained constant at all times by the spacer 40. Accordingly, even a unskilled operator is able to maintain the standoff constant at all times.

And, by varying the fixed position of the spacer 40 through loosening the screws 43, the above mentioned standoff can be varied as desired.

Also, the plasma gas that is blown from the plasma nozzle 32 onto the workpiece 45 will be emanated outwardly through the recesses 44 formed in the end surface of the spacer 40 and hence will not rebound onto the side of the plasma nozzle 32.

Figure 13:
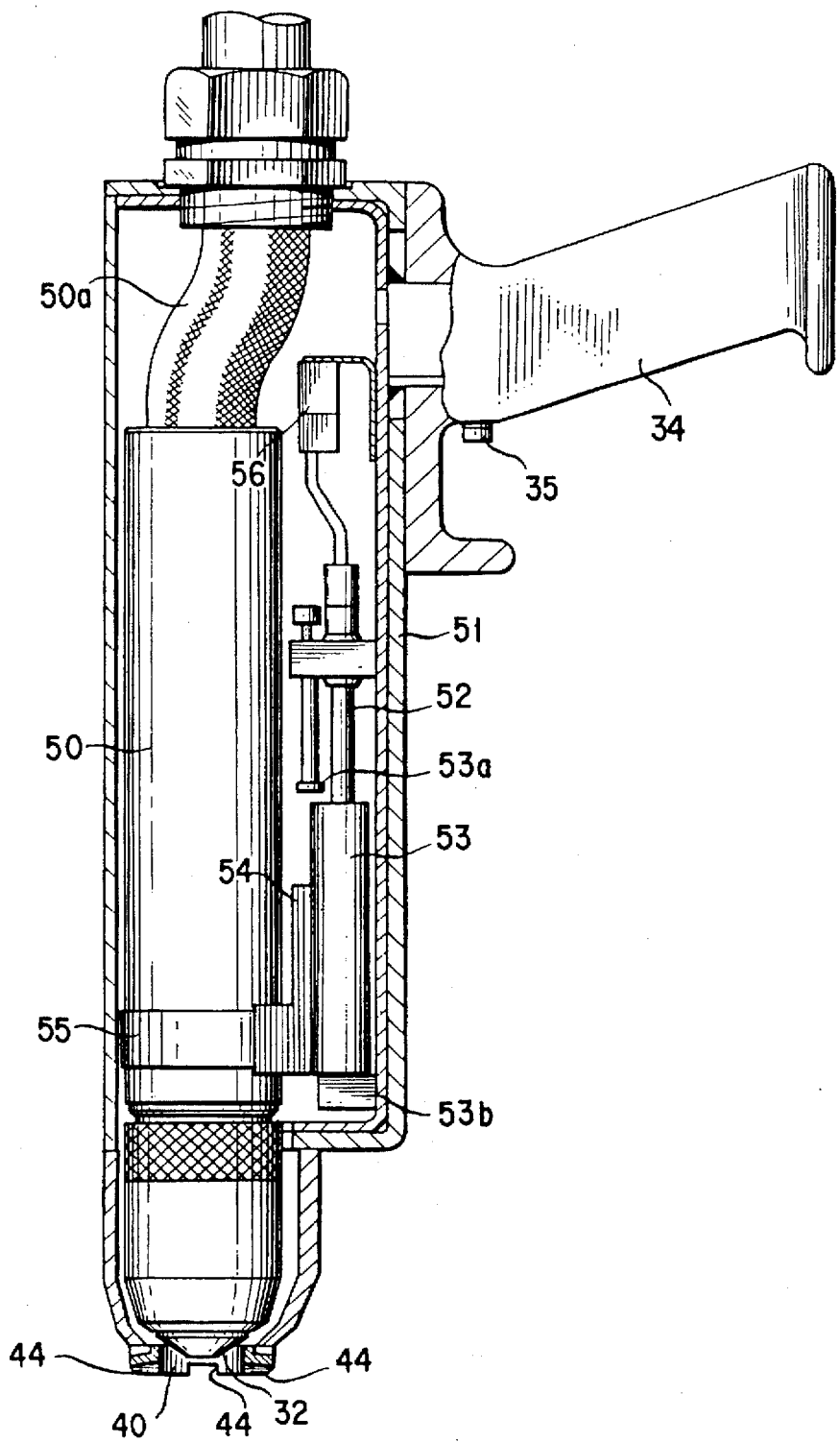
FIG. 13 is a sectional view in side elevation illustrating a forth embodiment of the plasma arc welding apparatus according to the present invention.

In FIG. 13, there is shown a fourth embodiment of the present invention, in which the standoff is made adjustable by a cylinder unit.

In this embodiment, a casing 51 is provided at a base of a plasma torch 50 so as to surround the latter and the frontal end of the plasma torch 50 is made axially displaceable so as to allow the standoff L to be freely adjusted within a limited range. Thus, the said casing 51 is designed to serve as a spacing retention member for maintaining or adjusting the standoff L.

More specifically, a portion 50a interposed between the frontal end and the base of the plasma torch 50 is made capable of being axially elongated and contracted and a cylinder 53 whose piston nod 52 is securely fixed to the casing 51 is provided in parallel to the plasma torch 50 and has attached to a side surface thereof the plasma torch 50 via a mounting table 54 and a band 55.

A pair of stoppers 53a and 53b are provided to limit the stroke amplitude of the above mentioned cylinder 53, one of them being adjustable in position externally. The frontal end portion of the casing 51 is integrally secured thereto a spacer 40 which is designed to establish the standoff of the plasma nozzle 32 as in the first embodiment. The above mentioned cylinder 53 is connected to an air source via an electromagnetic valve 56.

The above mentioned casing 51 is provided with a handle 34 at a peripheral location thereof, the handle 34 being in turn provided with a welding start switch 35. In wiring, the switch 5 is led to a control unit of a plasma power supply where it is specifically wired as required as in the above mentioned third embodiment.

According to this embodiment, the manipulation of the welding start switch 35 will trigger the automatic welding sequential operation and, at a predetermined time thereafter, the plasma torch 50 will be axially displaced by the cylinder unit 53 to adjust the standoff to a preselected value.

Figure 14:
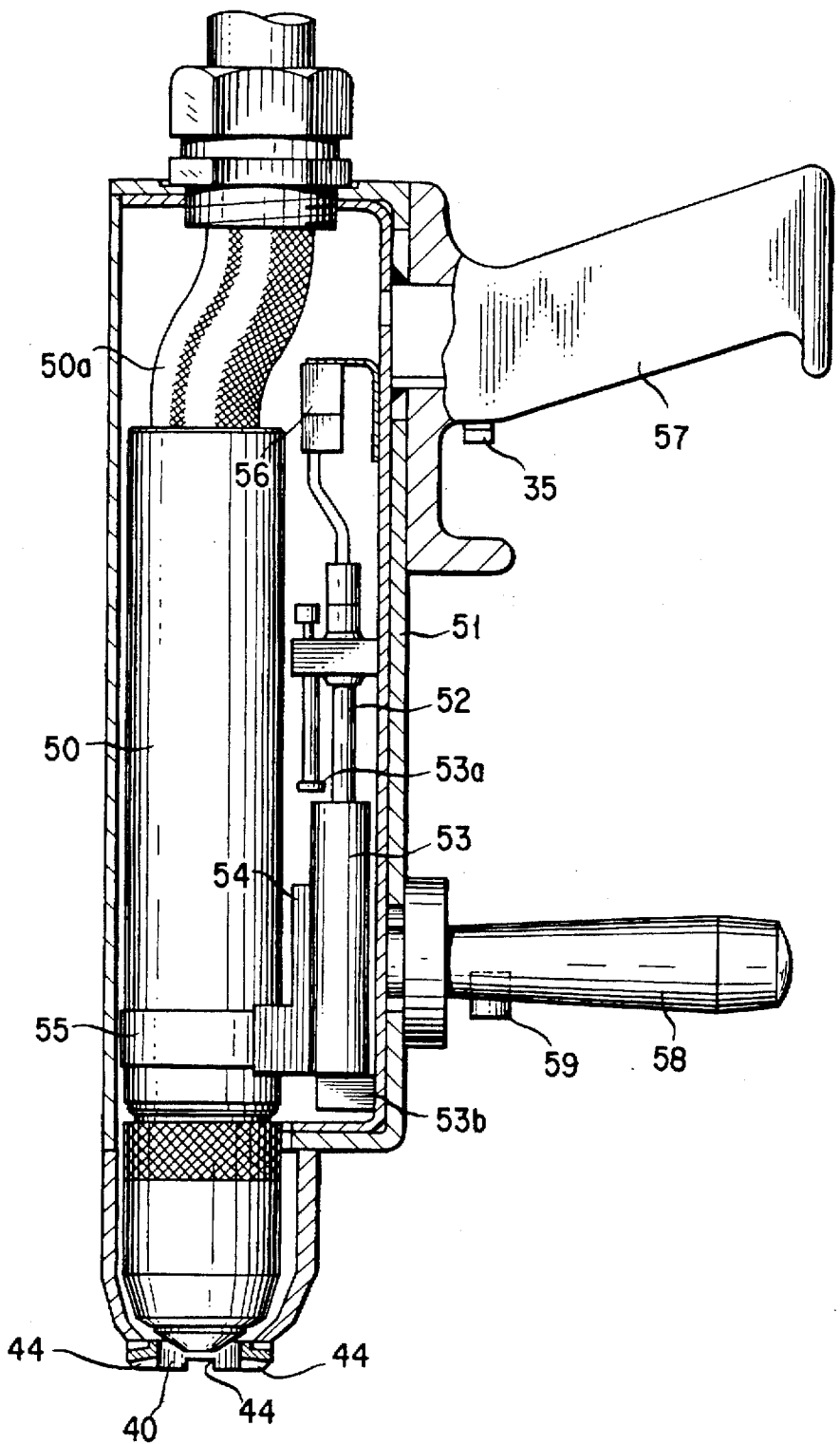
FIG. 14 is a sectional view in side elevation illustrating a fifth embodiment of the plasma arc welding apparatus according to the present invention.

FIG. 14 shows a fifth embodiment of the present invention, which in addition to the construction of the above mentioned fourth embodiment, is constructed to incorporate a further handle. Specifically, the internal construction of the casing 51 is the same as in the second embodiment while the above mentioned casing 51 is externally formed with a main handle 57 and an auxiliary handle 58 securely fixed at selected peripheral positions thereof which are axially spaced apart from each other. The main handle 57 is provided with a welding start switch 35 whereas the auxiliary handle 58 is provided with a torch displacement switch 59 designed to expand and retract the cylinder 53 by switching the electromagnetic valve 56.

According to this embodiment, both hands can be used to grip the main and auxiliary handles 57 and 58, respectively, for separate manipulations. And, by manipulating the torch displacement switch 59, the plasma torch 50 is axially displaced via the cylinder unit 53. The standoff that is defined with the frontal end of the spacer 40 is thereby adjusted.

It should be noted here that the above mentioned cylinder unit 53 may be adapted that makes use of those with a plurality of varying stroke lengths which are selectively operable for the purpose of enabling the adjustment of the standoff in multiple steps.

Figure 15:
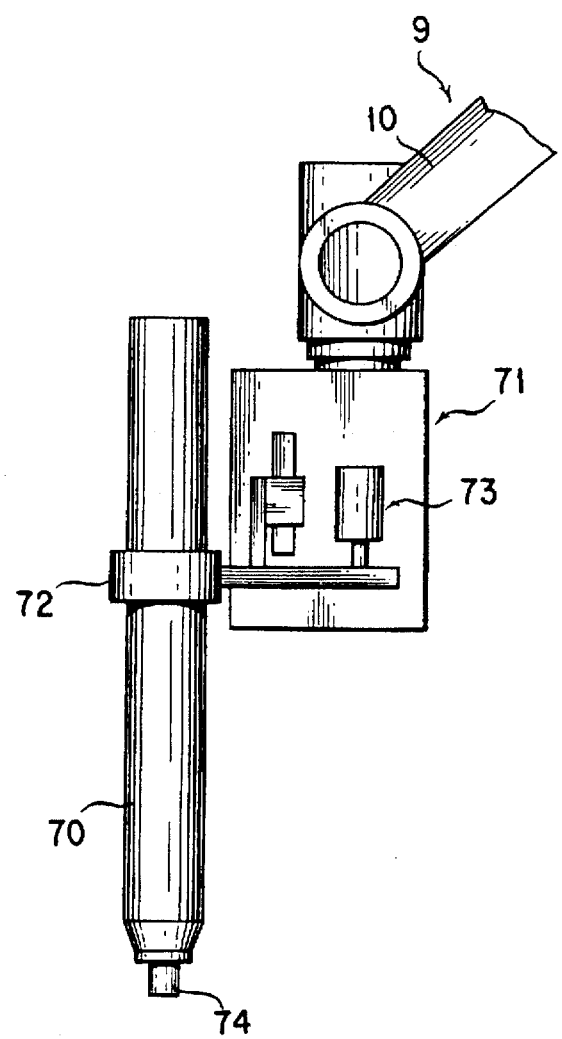
FIG. 15 is a side elevational view illustrating sixth embodiment of the plasma arc welding apparatus according to the present invention.

In FIG. 15, there is shown a sixth embodiment of the present invention, in which a protecting cap 74 is securely fixed to the frontal end of the plasma torch 70 and, in this instance, serves as a spacing retention member for maintaining the standoff L constant. Thus, the frontal end of the protecting cap 74 is positioned between the frontal end of the plasma torch 70 and a weld material. Also, a torch retention means 71 is securely fixed to the end of arm 10 of a welding robot 9 and has a plasma torch 70 securely fixed thereto via a bracket 72. And, the retention means 71 has an air cylinder unit 73 incorporated therein, by means of which the plasma torch 70 is made axially displaceable via the bracket 72.

It should be noted here that without intervention of the bracket 72, the plasma torch 70 is designed directly to be securely fixed to the air cylinder unit 73 so that it may be driven directly by the latter.

Figure 16:
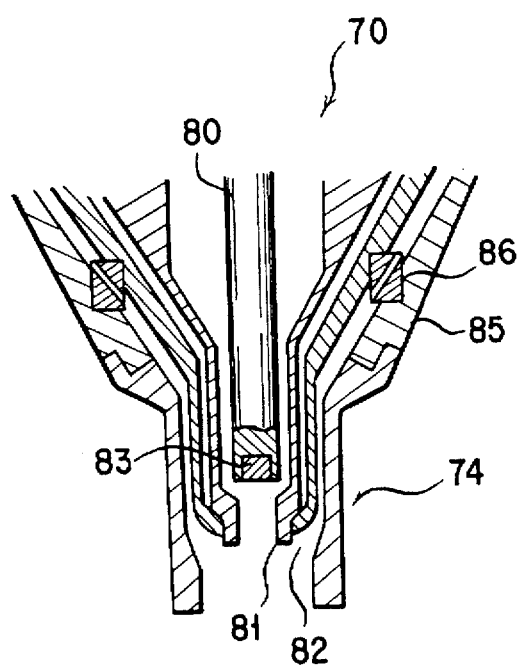
FIG. 16 is a cross sectional view illustrating a structure for attaching a protecting cap to the frontal end of a plasma torch in the above mentioned six embodiment.

In FIG. 16, there is shown a structure for assembling the protecting cap 74 with the frontal end of the plasma torch 70. The frontal end of the plasma torch 70 is provided with: an electrode portion 80, a first nozzle portion 81 which surrounds the electrode portion 80, a second nozzle portion 82 which surrounds the first nozzle portion 81 and whose frontal end is securely fixed thereto, and a shielding portion 85 which surrounds the second nozzle portion 82 and is securely fixed thereto via an electrically insulating material 86. A frontal end 83 of the electrode portion 80 is composed of tungsten. And, surrounding the second nozzle portion 82, the protecting cap 74 is securely fixed to the frontal end of the shielding portion 85. Since the second nozzle portion 82 and the shielding portion 85 are electrically insulated from each other, the protecting cap 74 may be composed of an electrically conductive material. Considering, however, the thermal influence and the strength that may withstand a thrust against the welding material, it should desirably be composed of a ceramic material such as SiC, $Al_2O_3$, $Si_3N_4$ or the like.

At this point it should be noted that the protecting cap 74 may detachably be securely fixed to the shielding portion 85 by a fixing means utilizing a threaded or screwing structure. Also, the frontal end peripheral wall of the protecting cap 74 may, here again, be formed with a hole or a recess 87 designed for venting a gas.

Next, a description will be made of a plasma torch safety interlock for preventing an electric shock, that may be used in any one of the third to fifth embodiments.

Figure 17:
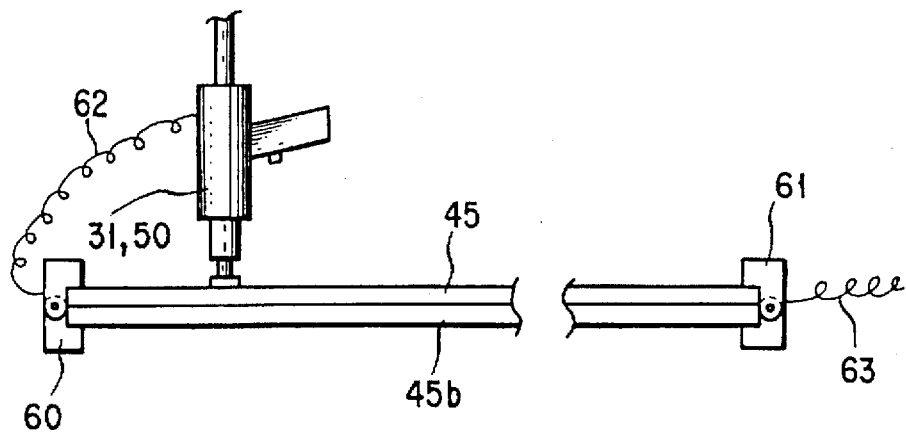
FIG. 17 is a diagrammatic view illustrating a state in which welding materials are clamped together by means of an interlock unit which may be adopted in any of the above mentioned third to fifth embodiments.

As shown in FIG. 17, a pair of welding materials (workpieces to be welded together) 45a and 45b are first so arranged as to be clamped together by a pair of workpiece clampers 60 and 61 to which a pair of interlock cables 62 and 63 are connected, respectively. And, the interlock cable 62 for the one workpiece clamper 60 is of a length which would largely exceed the operating zone for the plasma torch 31 or 50 acting on the workpieces 45a and 45b, which length is connected to the plasma torch 31 or 50.

Figure 18:
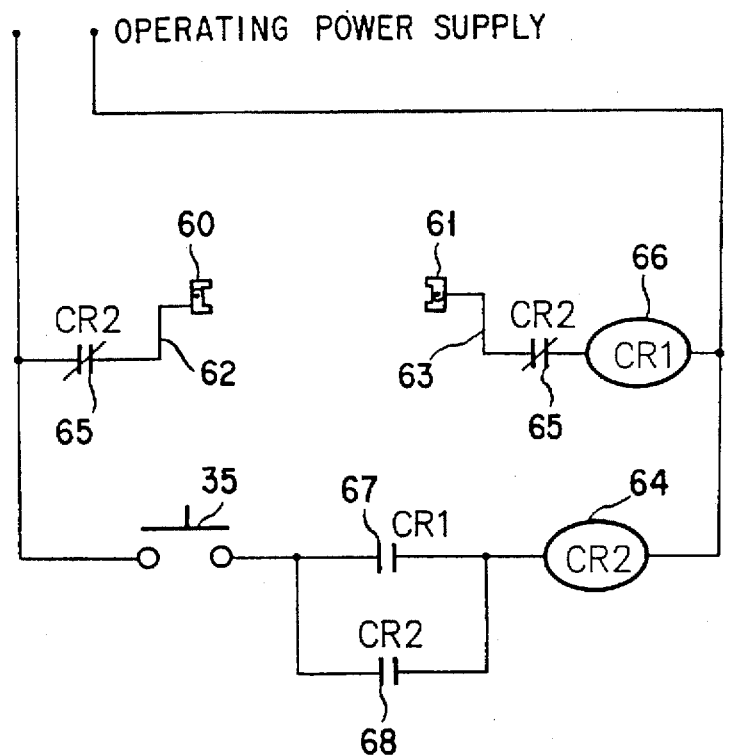
FIG. 18 is a circuit diagram illustrating an interlock circuit of the above mentioned interlock unit.

The above mentioned two interlock cables 62 and 63 are connected in an interlock circuit as shown in FIG. 18.

More specifically, the one interlock cable 62 is connected to an operating power source as shown, via a second normally closed contact 65 which is opened when a second relay 64 is turned on. The other interlock cable 63 is connected to the operating voltage via a second normally closed contact 65 as operated as mentioned above and also a first relay 66. And, in parallel to these two interlock cables 62 and 63, there is connected a circuit that comprises the welding start switch 35, a parallel network of a first and second normally open contacts 67 and 68 which are closed when the first and second relay 66 and 64 are turned on, respectively, and the second relay 64.

According to this construction, in the state where the workpieces 65a and 65b are not clamped by the clampers 60 and 61, the first and second normally open contacts 67 and 68 will remain open and, if it happens that the welding start switch 35 is turned on, a plasma arc welding operation will not be started. Thus, any careless activation of the welding start switch 35 will never cause an accident of electric shock.

On the other hand, when the workpieces 45a and 45b are clamped by the clampers 60 anti 61, a zone between the two clampers 60 and 61 will be made electrically conductive via the workpieces 45a and 45b to turn the first relay 66 on, thereby closing the first normally open contact 67. When this state is reached it will first become possible for an welding operation to be started by activating the welding start switch 35 on. Also, in this state, since the plasma torch 31 or 50 is in connection with the one workpiece clamper 60 via the one interlock cable 32, it follows that the plasma torch 31 or 50 lies positioned in the vicinity of the workpieces 45a and 45b, thereby confirming that the welding operation is ready to start.

Subsequently, when the welding start switch 35 is turned on, the second relay 64 will be operated to close the second normally open contact 68 and to self-hold the second relay 64 while opening the two second normally closed contacts 65 and 65 connected to the workpiece clampers 61 and 62. Thereafter, a desired welding operation will be carried out with the welding start switch 35 turned on and off as manipulated.

It should be noted at this point that while in the above mentioned embodiment, it is shown that the connection of the plasma torch 31 or 50 to the workpiece clamper 60 via the interlock cable 62 is used to confirm that the plasma torch 31 or 50 lies positioned in the vicinity of the workpieces 45a and 45b when clamped, this should not be considered to be limitative to the embodiment set forth. For example, it is possible to provide with a load cell or a sensor such as a proximity switch or a pressure switch for the spacer 40 and then to provide a safety interlock by detecting a contact or approach to a given degree of such spacer 40 with or towards the workpieces 45a and 45b.

Figure 19:
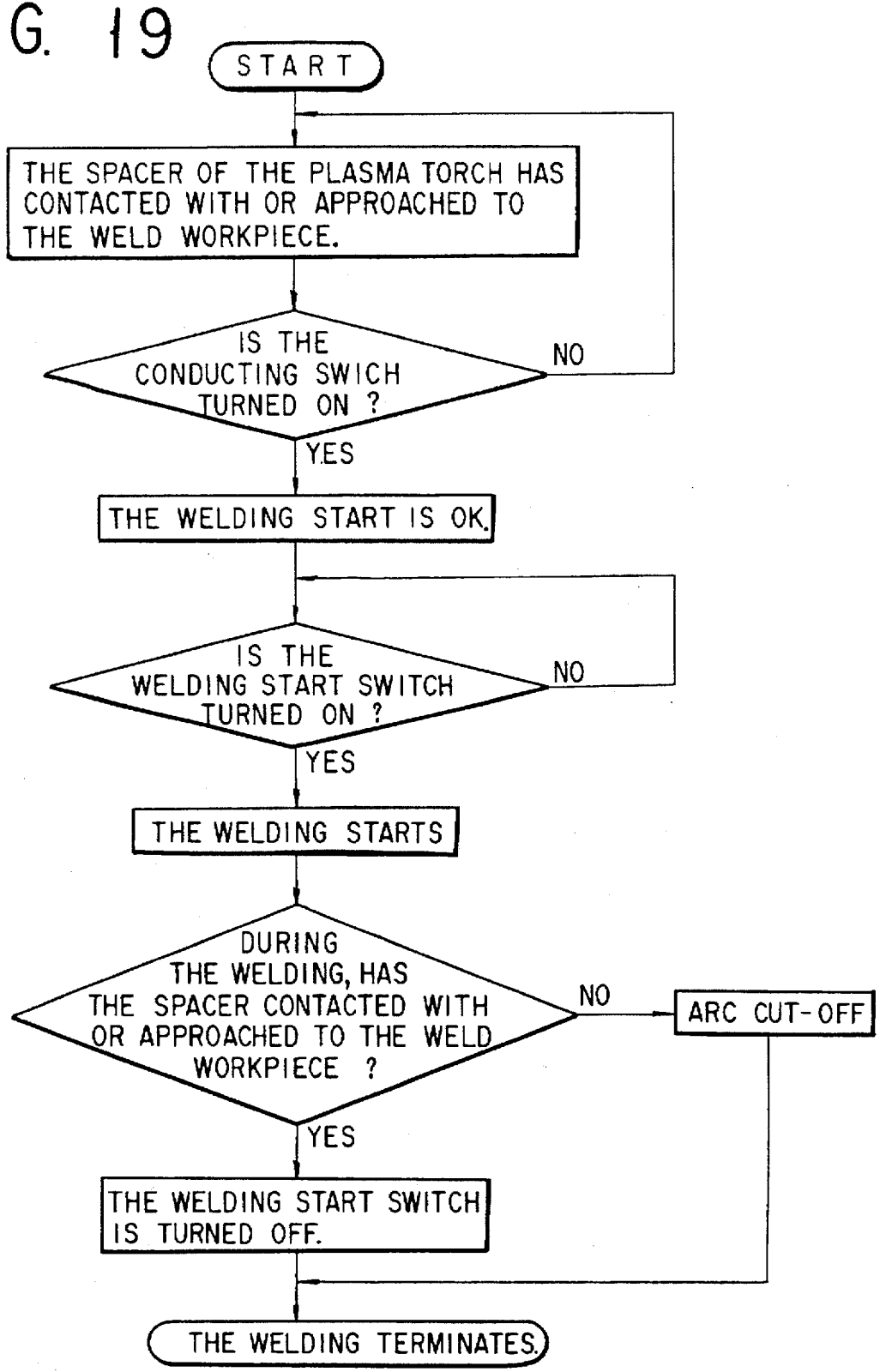
FIG. 19 is a flow chart illustrating a series of operational flows that may be included in an entire welding operation including an activation by means of the above mentioned interlock circuit.

In FIG. 19, there is shown a flow chart showing operational flows in an entire welding operation including an operation that can be activated by the above mentioned interlock circuit.

Figure 20:
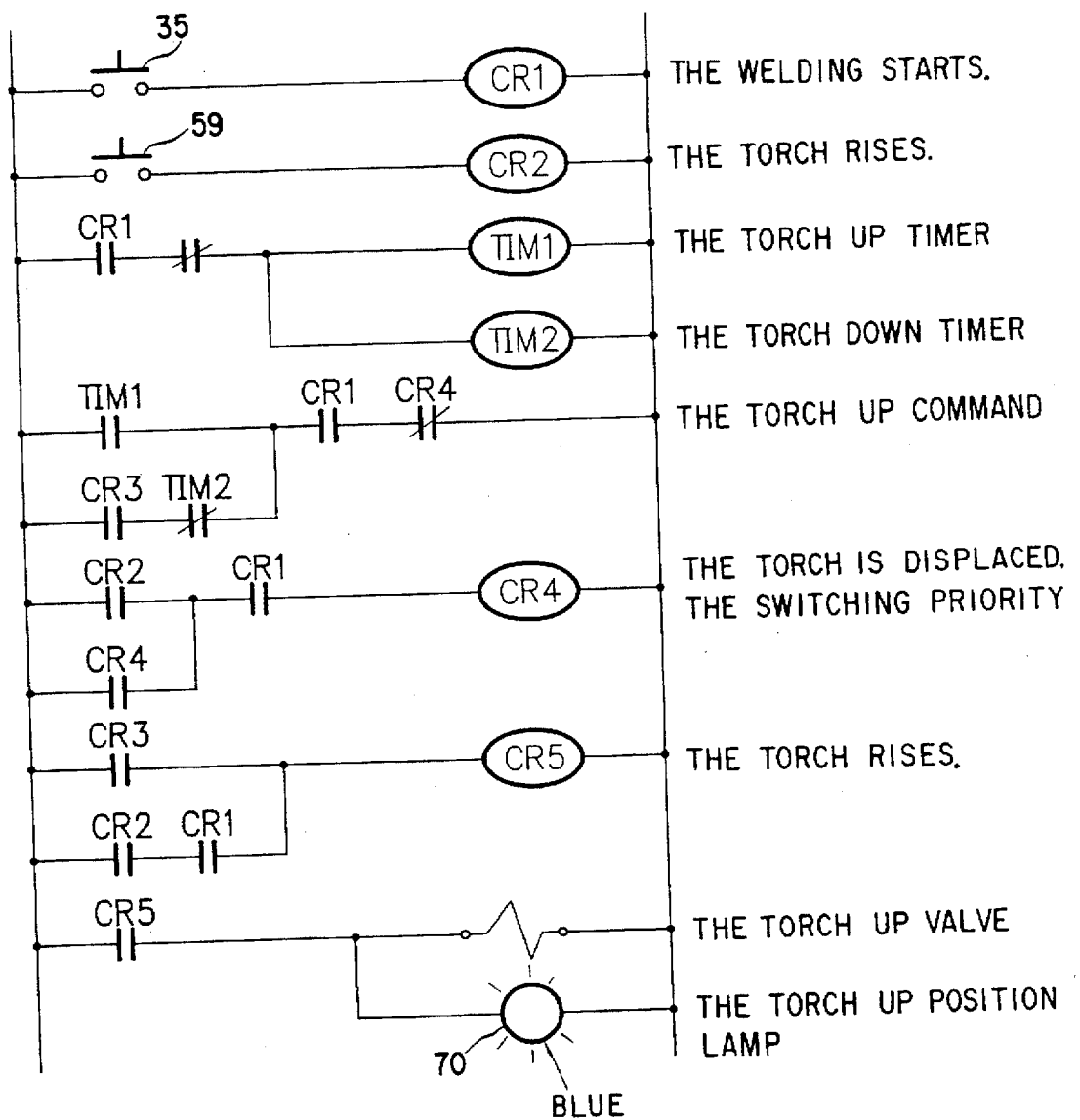
FIG. 20 is a circuit diagram illustrating an automatic standoff control circuit that may be adopted in any of the above mentioned second, fourth and fifth embodiments.

Further, in FIG. 20, there is shown an automatic standoff control circuit that can be adopted in any one of the above mentioned second, fourth and fifth embodiment of the present invention.

According to this control circuit, when the welding start switch 35 is turned on, an automatic standoff rise timer relay TIM1 and an automatic standoff fall time relay TIM2 will be operated. Then, after a predetermined time period that follows, a torch rise command will be issued.

When the torch displacement 59 is turned on, a standoff rise will be taken because of a standoff displacement priority. Together with this, a standoff rise valve will be operated and a standoff rise position lamp 70 will be lit. In this connection, it should be noted that the standoff rise position lamp 70 will be located where the plasma torch 7 or 50 is well viewable.

Figure 21:
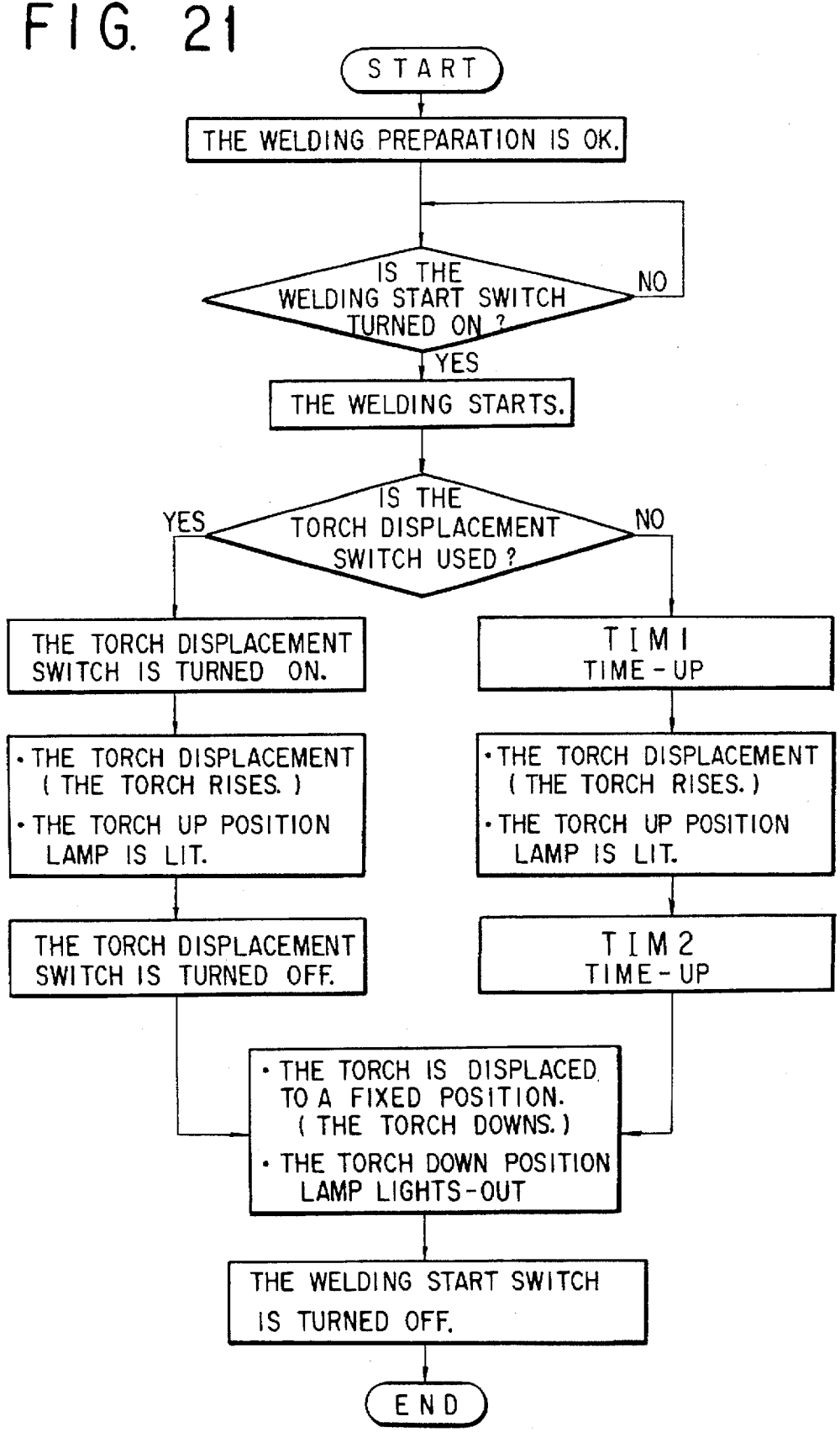
FIG. 21 is a flow chart for an automatic standoff control process that may be embodied in the above mentioned control circuit.

A flow diagram for this operation is shown in FIG. 21.

Thus, the standoff is made readily adjustable and an operation can be carried out at an optimum standoff for any particular material and thickness, whatsoever, of a workpiece.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly it should be understood that the present invention is not limited to the specific embodiments thereof set out above, but includes all possible embodiments thereof that can be made within the scope with respect to the features specifically set forth in the appended claims and encompasses all equivalents thereof.

INDUSTRIAL APPLICABILITIES

As set forth in the foregoing, a plasma arc welding apparatus and a welding method using tile same according to the present invention are extremely useful in welding together a plurality of plate materials that are placed one over another.

What is claimed is:

1. A plasma arc welding apparatus, comprising:

a plasma torch; and a spacing retention member which is coupled to said plasma torch and of which a frontal end is located between a frontal end of said plasma torch and a weld workpiece and is adapted to be pressed against said workpiece while the latter is being welded, said spacing retention member being constituted by a torch holder which is so threaded with said plasma torch as to be capable of advancing and retreating axially relative to said plasma torch to establish an optimum standoff between the front end of the plasma torch and said workpiece, said torch holder constituting said spacing retention member being mounted on an arm of a welding robot.

2. A plasma arc welding apparatus as set forth in claim 1, wherein the frontal end of said spacing retention member is adjustable in an axial position thereof relative to the frontal end of said plasma torch to optimally alter said standoff while said workpiece is being welded.

3. A plasma arc welding apparatus as set forth in claim 1 or claim 2, wherein there is provided a displacement means for displacing said spacing retention member relative to the weld workpiece to optimally alter said standoff while the latter is being welded.

4. A plasma arc welding apparatus as set forth in claim 1, wherein between said torch holder and said arm there is interposed a displacement unit for displacing said spacing retention member relative to said workpiece to optimally alter said standoff while the latter is being displaced.

5. A plasma arc welding apparatus as set forth in claim 1, wherein said torch holder is cylindrical and surrounds the frontal end of said plasma torch, and said torch holder has at a frontal end thereof a peripheral wall which is formed with a hole or recess that is designed to vent a gas.

6. A plasma arc welding apparatus, comprising:

a plasma torch; and a spacing retention member which is coupled to said plasma torch and of which a frontal end is located between a frontal end of said plasma torch and a weld workpiece and is adapted to be pressed against said workpiece while the latter is being welded, said spacing retention means being constituted by a casing which is constructed to surround said plasma torch and which is so coupled to the latter as to be capable of advancing and retracting relative to said plasma torch to establish an optimum standoff between said frontal end of the plasma torch and said workpiece, said casing constituting said spacing retention member being mounted on an arm of a welding robot.

7. A plasma arc welding apparatus as set forth in claim 6, wherein the frontal end of said spacing retention member is adjustable in an axial position thereof relative to the frontal end of said plasma torch to optimally alter said standoff while said workpiece is being welded.

8. A plasma arc welding apparatus as set forth in claim 6 or claim 7, wherein there is provided a displacement means for displacing said spacing retention member relative to the weld workpiece to optimally alter said standoff while the latter is being welded.

9. A plasma arc welding apparatus, comprising:

a plasma torch; and a spacing retention member which is securely fixed to said plasma torch and of which a frontal end is located between a frontal end of said plasma torch and a weld workpiece and is adapted to be displaced against the said workpiece while the latter is being welded, said spacing retention means being constituted by a casing which is constructed to surround said plasma torch and is mounted on an arm of a welding robot, wherein a portion between the casing mounting portion and the frontal end of said plasma torch is made capable of being elongated and contracted, and said frontal end of said plasma torch is made displaceable relative to said casing by means of a displacement unit which is securely fixed to said casing.

10. A plasma arc welding apparatus as set forth in claim 6, wherein said casing has at a frontal end thereof a peripheral wall which is formed with a hole or recess designed to vent a gas.

11. A plasma arc welding apparatus, comprising:

a plasma torch; and a spacing retention member which is coupled to said plasma torch and of which a frontal end is located between a frontal end of said plasma torch and a weld workpiece and is adapted to be pressed against said workpiece while the latter is being welded, said spacing retention member being constituted by an annular spacer which is so coupled to and carried by the frontal end of said plasma torch as to be capable of advancing and retracting relative thereto to establish an optimum standoff between said frontal end of the plasma torch and said workpiece, said plasma torch carrying said spacer retention means having a handle securely fixed thereto.

12. A plasma arc welding apparatus as set forth in claim 11, wherein the frontal end of said spacing retention member is adjustable in an axial position thereof relative to the frontal end of said plasma torch to optimally alter said standoff while said workpiece is being welded.

13. A plasma arc welding apparatus as set forth in claim 11 or claim 12, wherein there is provided a displacement means for displacing said spacing retention member relative to the weld workpiece to optimally alter said standoff while the latter is being welded.

14. A plasma arc welding apparatus as set forth in claim 11, wherein said spacer has a peripheral wall thereof which is formed with a hole or recess that is designed to vent a gas.

15. A plasma arc welding apparatus as set forth in claim 11, wherein between said plasma torch and an operating power supply there is provided an interlock circuit for preventing an incidence of electric shock.

16. A plasma arc welding apparatus as set forth in claim 15, wherein a welding start switch which is included in said interlock circuit is provided at said handle.

17. A plasma arc welding apparatus, comprising:

a plasma torch; and a spacing retention member which is securely fixed to said plasma torch and of which a frontal end is located between a frontal end of said plasma torch and a weld workpiece and is adapted to be displaced against the said workpiece while the latter is being welded, said spacing retention member being constituted by an annular spacer attached to the frontal end of said plasma torch, said plasma torch having a handle securely fixed thereto, wherein said spacer is formed with a supporting frame which is axially slidably fitted with a bracket that is securely fixed to the frontal end of said plasma torch and which is fitted in an elongate hole extending axially of said supporting frame, and said supporting frame is fixed to said bracket adjustably in an axial position by means of a fixing screw which is threadedly attached to said bracket.

18. A plasma arc welding apparatus, comprising:

a plasma torch; and a spacing retention member which is coupled to said plasma torch and of which a frontal end is located between a frontal end of said plasma torch and a weld workpiece and is adapted to be pressed against said workpiece while the latter is being welded, said spacing retention member being constituted by a casing which is constructed to surround said plasma torch and which is so carried thereby as to be capable of advancing and retracting relative to said plasma torch to establish an optimum standoff between said frontal end of the plasma torch and said workpiece, said casing carrying said spacing retention member having a handle securely fixed thereto.

19. A plasma arc welding apparatus as set forth in claim 18, wherein the frontal end of said spacing retention member is adjustable in an axial position thereof relative to the frontal end of said plasma torch to optimally alter said standoff while said workpiece is being welded.

20. A plasma arc welding apparatus as set forth in claim 18 or claim 19, wherein there is provided a displacement means for displacing said spacing retention member relative to the weld workpiece to optimally alter said standoff while the latter is being welded.

21. A plasma arc welding apparatus as set forth in claim 18, wherein said handle comprises a pair of handles which are securely fixed to said casing.

22. A plasma arc welding apparatus, comprising:

a plasma torch; and a spacing retention member which is securely fixed to said plasma torch and of which a frontal end is located between a frontal end of said plasma torch and a weld workpiece and is adapted to be displaced against the said workpiece while the latter is being welded, said spacing retention member being constituted by a casing for surrounding said plasma torch, said casing having a handle securely fixed thereto, wherein a portion between a casing mounting portion and the frontal end of said plasma torch is made capable of being elongated and contracted, and said frontal end of said plasma torch is made axially displaceable relative to said casing by means of a displacement unit which is securely fixed to said casing.

23. A plasma arc welding apparatus as set forth in claim 18, wherein said casing has at a frontal end thereof a peripheral wall which is formed with a hole or recess designed to vent a gas.

24. A plasma arc welding apparatus as set forth in claim 18, wherein between said plasma torch and an operating power supply there is provided an interlock circuit for preventing an incidence of electric shock, and an automatic standoff control circuit is connected to said displacement unit.

25. A plasma arc welding apparatus as set forth in claim 24, wherein a welding start switch which is included in said interlock circuit as well as a torch displacement switch which is included in said automatic standoff control circuit is provided at said handle.

26. A plasma arc welding apparatus, comprising:

a plasma torch; and a spacing retention member which is coupled to said plasma torch and of which a frontal end is located between a frontal end of said plasma torch and a weld workpiece and is adapted to be pressed against said workpiece while the latter is being welded, said spacing retention member being constituted by a protecting cap which is carried by said plasma torch as to be capable of advancing and retracting relative to said plasma torch to establish an optimum standoff between said frontal end of the plasma torch and said workpiece, said plasma torch carrying said spacing retention member being mounted on an arm of a welding robot.

27. A plasma arc welding apparatus as set forth in claim 26, wherein the frontal end of said spacing retention member is adjustable in an axial position thereof relative to the frontal end of said plasma torch to optimally alter said standoff while said workpiece is being welded.

28. A plasma arc welding apparatus as set forth in claim 26 or claim 27, wherein there is provided a displacement means for displacing said spacing retention member relative to the weld workpiece to optimally alter said standoff while the latter is being welded.

29. A plasma arc welding apparatus as set forth in claim 26, wherein between said plasma torch and said arm there is interposed a displacement unit for displacing said spacing retention member relative to said workpiece to optimally alter said standoff while the latter is being displaced.

30. A plasma arc welding apparatus as set forth in claim 26, wherein said protecting cap is cylindrical surrounding the frontal end of said plasma torch, and said protecting cap has at a frontal end thereof a peripheral wall which is formed with a hole or recess designed to vent a gas.

31. A plasma arc welding apparatus as set forth in any one of claims 4, 5, 9, 10 and 18, wherein an automatic standoff control circuit is connected to said displacement unit.

32. A plasma arc welding apparatus as set forth in claim 31, wherein a torch displacement switch which is included in said automatic standoff control circuit is provided at said handle.

33. A method of a plasma arc welding method, comprising the steps of:

providing a plasma torch;

providing a spacing retention means which is coupled to said plasma torch and of which a frontal end is located between a frontal end of said plasma torch and a weld workpiece and is adapted to be pressed against said workpiece while the latter is being displaced;

permitting said spacing retention member to be advanced and retracted axially relative to said plasma torch so as to establish an optimal standoff between said front end of the plasma torch and said workpiece for an initial phase of a given welding operation; and relatively displacing said plasma torch and said spacing retention means so as to optimally alter said standoff during said given welding operation.

\* \* \* \* \*